Oct. 16, 1956    J. M. ELLSWORTH    2,766,640
AIR BRAKE PEDAL
Filed May 29, 1953    2 Sheets-Sheet 1
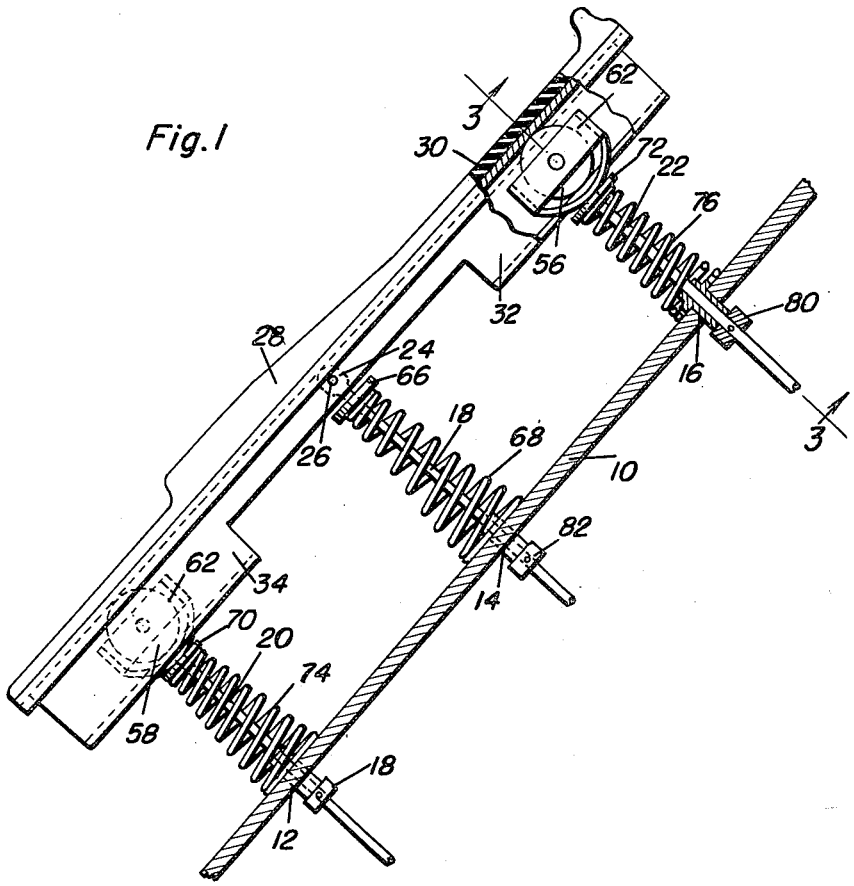
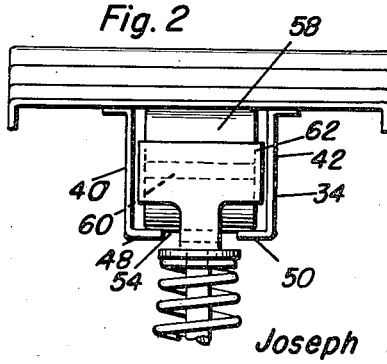
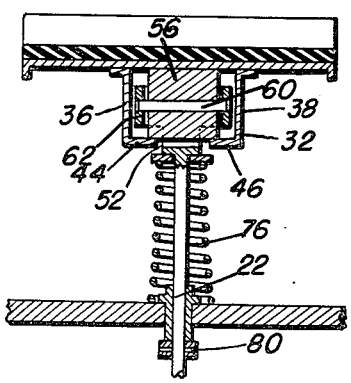
Joseph M. Ellsworth
INVENTOR.

Oct. 16, 1956   J. M. ELLSWORTH   2,766,640
AIR BRAKE PEDAL
Filed May 29, 1953   2 Sheets-Sheet 2
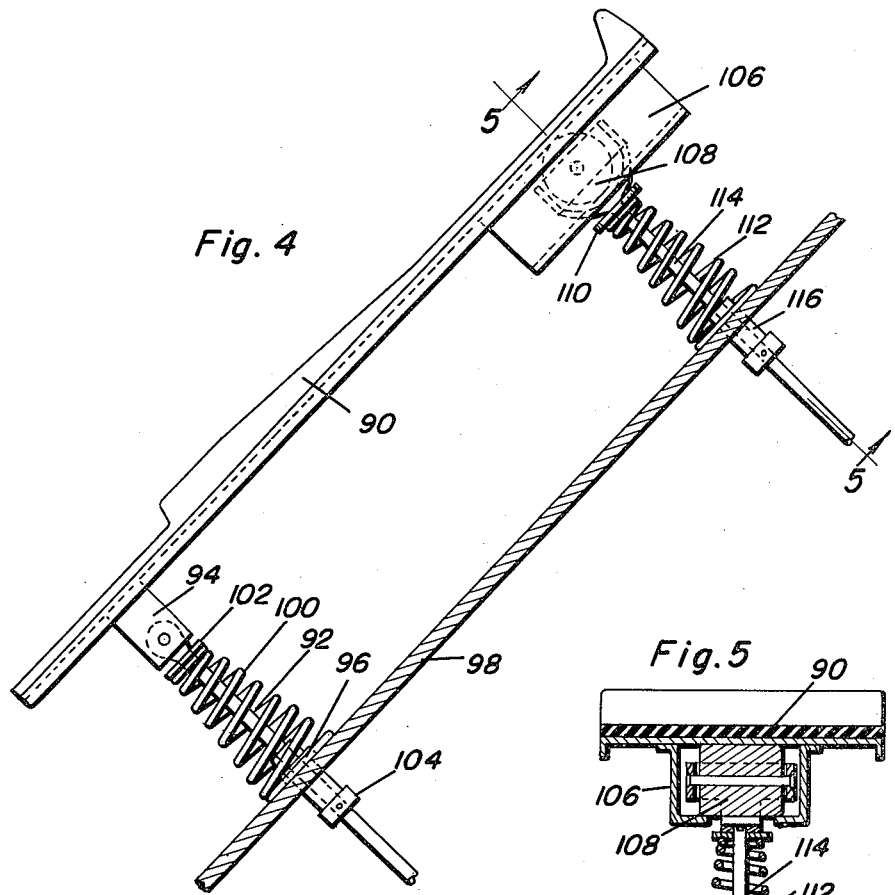
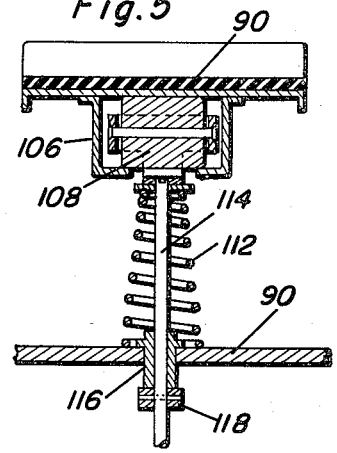
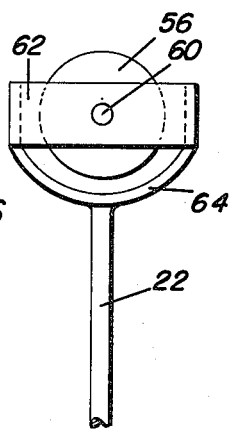
Joseph M. Ellsworth
INVENTOR.
BY *Clarence A. O'Brien*
*and Harvey B. Jacobson*
Attorneys

United States Patent Office 2,766,640
Patented Oct. 16, 1956

2,766,640
AIR BRAKE PEDAL

Joseph M. Ellsworth, Goodyears Bar, Calif., assignor of one-half to Joseph D. Ellsworth, North Sacramento, Calif.

Application May 29, 1953, Serial No. 358,491

2 Claims. (Cl. 74—478)

This invention relates to a brake pedal especially adapted to be used in conjunction with conventional air brakes as are presently mounted on tractor-trailer combination or other types of motor vehicles.

The primary object of the invention resides in the provision of a brake pedal which can be used to selectively actuate either the brake of the tractor vehicle or the brake of the trailer component, the brake pedal being constructed to permit operation of the brakes of both components of the combination vehicle at one time.

The construction of this invention features casings within which rollers connected to the brake actuated rod are mounted. These rollers are restrained from vertical movement relative to the brake pedal by the novel construction of inwardly converging flanges forming part of the casing. In use the device enables the operator of a combination vehicle equipped with air brakes to apply brakes on either vehicle individually or simultaneously. The operator may judiciously vary pressure on either of the sets of brakes as desired to thus maintain the safe operation adapted to prevent accidental jack-knifing and other casualties which all too frequently occur.

Still further objects and features of the invention reside in the provision of an air brake pedal that is strong and durable, capable of being readily and easily installed on many various existing vehicles, which is comparatively easy to manufacture due to the relatively few parts, and which is inexpensive to produce thus affording possibilities of wide distribution in the automotive field.

These, together with the various ancillary objects and features of the invention which will become apparent as the following description proceeds, are attained by this air brake pedal, preferred embodiments of which have been illustrated in the accompanying drawings, by way of example only, wherein:

Figure 1 is a wide elevational view of air brake pedal constructed in accordance with the present invention with parts thereof being shown in section for greater detail;

Figure 2 is an end elevational view of the air brake pedal comprising the present invention;

Figure 3 is a sectional detail view as taken along the plane of line 3—3 in Figure 1;

Figure 4 is a side elevational view of a modified form of the invention;

Figure 5 is a sectional detail view as taken along the plane of line 5—5 in Figure 1; and Figure 6 is a partial elevational detail illustrating the construction of a brake actuating rod.

With continuing reference to the accompanying drawings wherein like reference numerals designate similar parts throughout the various views, reference numeral 10 generally designates the floor board of a tractor vehicle, such as the cab of the tractor as generally used in a tractor-trailer combination. Secured in the floor board 10 are grommets 12, 14, and 16 which form guides for the fulcrum rod 18 and the brake actuating rods 20 and 22. The fulcrum rod 18 is provided with an eye 24 at its upper end and a pin 26 is used to attach the rod in a pivotable manner to the brake pedal 28. The brake pedal 28 may be provided with a resilient foot engaging pad 30 and has casings 32 and 34 depending therefrom. The casings 32 and 34 include side plates 36 and 38 and 40, 42, respectively, which in turn have inwardly converging flanges 44 and 46, and 48 and 50. These flanges 44, 46, 48 and 50 form slots 52 and 54 which are adapted to permit insertion of rollers 56 and 58 therein since, as can be best seen in Figure 2, the slots are of greater dimensions than the arcuate rods 64. These rollers 56 and 58 are each mounted on pins 60 extending between pairs of plates 62 of a rectangular frame, each connected by an arcuate rod 64 to the brake actuating rods 20 and 22.

A collar 66 is mounted on the fulcrum rod 18 and a coil spring 68 biases the floor board 10 and the collar 66. The fulcrum rod 18 extends through the grommet 14 thus forming a fulcrum for the brake pedal 28. There are mounted on the brake actuating rods 20 and 22 collars 70 and 72 and springs 74 and 76 coacting with the rods 20 and 22 bias the floor board 10 and the collars 70 and 72.

The brake actuating rods 20 and 22 extend through the floor board 10 and collars 78 and 80 are provided for limiting the uppermost position to which the springs 74 and 76 can urge the brake pedal 28. A collar 82 is likewise provided for the fulcrum rod 18. It is to be noted that the collars 78, 80, and 82 may be adjusted on the respective rods using suitable set screws, it is to be noted that the brake actuating rod 20 is connected to the trailer brake valve while the brake actuating rod 22 may be connected to the tractor brake valve. Hence, upon application of pressure on either or both of the rods the brakes will be actuated.

In operation, the operator upon application of pressure with his toe will actuate the tractor brake valve to stop the motion of the tractor component. Upon application of pressure using the heel of the foot, the operator will apply the brake to the trailer. Hence, when descending a grade or stopping after travelling at a considerable speed, the brakes on the trailer vehicle can be applied first thus preventing such dangerous occurrences as jack-knifing. It is to be noted that the fulcrum rod 18 provides means to insure more selective and accurate control of the brakes of the various vehicles. However, when it is desired to simplify the device, there may as is shown in Figure 4 be provided a brake pedal 90 having a fulcrum rod 92 attached to a lug 94 depending from the brake pedal 90. The rod 92 extends through a grommet 96 in the floor board 98. A coil spring 100 biases a collar 102 mounted on the rod 92 and the floor board. A limit stop collar 104 is mounted on the rod 92 below the floor board. However, the rod 92 in this case performs the function of both fulcrum rod and the trailer brake actuating rod. The casing 106 is of similar construction to the casings 32 and 34 and retains a roller 108 therein of similar construction to the rollers heretofore described. A collar 110 is biased by a spring 112 coaxial with a brake actuating rod 114 which extends through a grommet 116 in the floor board 98. This rod 114 acts as a brake actuating rod and is adapted to operate the air brakes of the tractor vehicle. A collar 118 is provided for limiting the upper position of the brake 90. This device operates in substantially the same manner as the device employing the centrally disposed fulcrum rod but of course is less accurate in the operation thereof.

Since from the foregoing the construction and arrangement of this air brake control mechanism, are readily apparent, further description is believed to be unnecessary.

However, since numerous modifications will readily occur to those skilled in the art after a consideration of the foregoing specification and accompanying drawings, it is.

not intended to limit the invention to the precise embodiment shown and described, but all suitable modifications and equivalents may be readily resorted to.

What is claimed as new is as follows:

1. A brake for use in tractor-trailer combination vehicles comprising a brake pedal, a fulcrum rod pivotally attached to said brake pedal and extending through the floor board of the tractor component, an upper collar on said fulcrum rod, resilient means biasing said upper collar and said floor board, a lower collar attached to said fulcrum rod below said floor board forming a limit stop, at least one roller retaining casing secured to said brake pedal, a brake actuating rod extending through said floor board, a roller rotatably carried by said brake actuating rod mounted in said casing, and resilient means biasing said floor board and collar on said brake actuating rod, said casing comprising spaced side plates, said side plates having inwardly extending flanges attached thereto, said flanges preventing relative vertical movement of said brake pedal and said roller, said floor board having a plurality of guide grommets secured therein, said fulcrum rod and said brake actuating rod extending through said grommets.

2. A brake for use in tractor-trailer combination vehicles comprising a brake pedal, a fulcrum rod pivotally attached to said brake pedal and extending through the floor board of the tractor component, an upper collar on said fulcrum rod, resilient means biasing said upper collar and said floor board, a lower collar attached to said fulcrum rod below said floor board forming a limit stop, a pair of roller retaining casings secured to said brake pedal, brake actuating rods extending through said floor boards on either side of said fulcrum rod, rollers rotatably carried by said brake actuating rods mounted in said casing, and springs biasing said floor board and collars on said brake actuating rods, said casings comprising spaced side plates, said side plates having inwardly extending flanges attached thereto, said flanges preventing relative vertical movements of said brake pedal and said roller, said floor board having a plurality of guide grommets secured therein, said fulcrum rod and said brake actuating rods extending through said grommets.

References Cited in the file of this patent
UNITED STATES PATENTS

| | | |
|---|---|---|
| 1,496,185 | Tartaglia | June 3, 1924 |
| 1,845,995 | Topp | Feb. 16, 1932 |
| 2,087,205 | Polete | July 13, 1937 |
| 2,259,774 | Perkins | Oct. 21, 1941 |
| 2,620,050 | Ménard | Dec. 2, 1952 |